United States Patent
Marelas (10) Patent No.: US 11,314,598 B2
(45) Date of Patent: Apr. 26, 2022

(54) METHOD FOR APPROXIMATING SIMILARITY BETWEEN OBJECTS

(71) Applicant: EMC IP Holding Company LLC, Hopkinton, MA (US)

(72) Inventor: Peter Marelas, Donvale (AU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 437 days.

(21) Appl. No.: 15/964,527

(22) Filed: Apr. 27, 2018

(65) Prior Publication Data

US 2019/0332492 A1 Oct. 31, 2019

(51) Int. Cl.
- *G06F 11/14* (2006.01)
- *H04L 29/08* (2006.01)
- *G06F 16/13* (2019.01)
- *H04L 67/1097* (2022.01)

(52) U.S. Cl.
CPC ........ *G06F 11/1453* (2013.01); *G06F 16/137* (2019.01); *H04L 67/1097* (2013.01)

(58) Field of Classification Search
CPC . G06F 11/1453; G06F 16/137; H04L 67/1097
See application file for complete search history.

(56) References Cited

U.S. PATENT DOCUMENTS

| | | | | |
|---|---|---|---|---|
| 2012/0314959 A1* | 12/2012 | White | ................ | G06F 16/137 382/197 |
| 2015/0007319 A1* | 1/2015 | Antonov | ................ | G06F 21/56 726/23 |
| 2015/0154192 A1* | 6/2015 | Lysne | ................ | G06F 17/16 707/748 |
| 2016/0042252 A1* | 2/2016 | Sawhney | ................ | G06F 16/55 382/190 |
| 2016/0092557 A1* | 3/2016 | Stojanovic | ............ | G06F 16/254 707/723 |
| 2016/0359740 A1* | 12/2016 | Parandehgheibi | ...... | H04L 41/12 |
| 2019/0266257 A1* | 8/2019 | Natchu | ................ | G06F 16/95 |

* cited by examiner

*Primary Examiner* — Alford W Kindred
*Assistant Examiner* — Lin Lin M Htay
(74) *Attorney, Agent, or Firm* — Workman Nydegger (57) ABSTRACT

Systems and methods for determining similarity between sets of objects are disclosed. A set of hashes are generated for a set of objects. A similarity vector is generated for the set of hashes. The similarity vector is a compact representation of the set of hashes and of the corresponding set of objects. The similarity of the set of objects is determined by comparing the similarity vector of the set of objects with other similarity vectors. In a data protection system, the set of objects can be placed with the node or system that stores objects that are most similar to the set of objects being placed.

16 Claims, 8 Drawing Sheets

Figure 1 cf006b4e6634069fa563dd250e6f382e02ea3a27
c9e289073b4b4cf7e5bbd047114475bc0c0ba392
967de4579d8339f79b6a75007ed63cb6be8cd0f8
80167dc855de84cf39d809f9c0f308df1671dc85
97dae9eb551fe6ea0e054e68c4db11f2e0440442
0ed98e45630047512e762b5665c4d96155867c9
ae24ecf91ac51448eaa4fea16dd74f1323586956e
1faf0afae9184c069927d64afbfde3250429ea47
4efeeaa055997e50400308ae0adb86b8848a7c6e2
e52371d9c9bef865e75e5cd1280d18b78f46f86

METHOD FOR APPROXIMATING SIMILARITY BETWEEN OBJECTS

FIELD OF THE INVENTION

Embodiments of the present invention to systems and methods for approximating the similarity between objects or sets of objects. More particularly, embodiments of the invention relate to placing objects in a distributed backup system based on similarities between the objects being placed and the objects previously placed.

BACKGROUND

De-duplication systems seek to optimize data storage by detecting common blocks in data and only storing the minimal number of the blocks. Ideally, a block is stored once. These systems often leverage a hashing algorithm (e.g., SHA1) in order to uniquely identify the blocks in the de-duplication system. The uniqueness of a block is determined by comparing the hash of a block to an index of hashes representing blocks already stored in the de-duplication system. When the hash of an object is already in the index, there is no need to store the object because the object is already stored in the system.

As the storage requirements increase, there is a need to scale the de-duplication system. In order to scale the de-duplication system, the de-duplication system may implement a scale-up architecture so that comparisons between hashes can be managed in main memory using the entire hash index or partial cached versions of the hash index which are organized using some heuristic (e.g., Data Domain Stream-Informed Segment Layout). The downside to a scale-up architecture is at a given scaling point the main memory of a system can no longer scale.

Consequently, scale-up architectures need to evolve to also accommodate a scale-out architecture. In a scale-out architecture, the work is divided across a distributed set of nodes. However, de-duplication is more complicated in scale-out systems. For example, scale-out systems introduce latency due to the introduction of east-west traffic and the need for coordination amongst the nodes.

In particular, in a scale-out system that de-duplicates data, the hash index must be distributed. This could be implemented in two ways. The hash index can be distributed evenly and maintained in memory, making the hash index accessible across all nodes. Alternatively, the de-duplication hash index may only represent blocks that are local to a given node.

In the first case where the hash index is distributed evenly across all nodes and maintained in memory, object placement algorithms do not need to consider similarity between objects when selecting a target node as all blocks in the system will be checked for duplication against the distributed de-duplication index. While this is advantageous to preserve global de-duplication, the disadvantages include the significant memory required to store the entire deduplication index with sufficient redundancy to accommodate node failures and the east-west latency introduced when querying the distributed deduplication index.

Alternatively, a local hash index could be maintained per node. This solution, however, compromises the goal of global de-duplication and may lead to a system that stores the same object multiple times. Systems and methods are needed to allow for local or distributed de-duplication that improves or maximizes de-duplication across a set of nodes. This is achieved in embodiments of the invention by collocating similar objects on the same node, either during ingest or post-process.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of invention relate to systems and methods for de-duplicating data or objects in a computing system. The computing system may be local, distributed, cloud-based, or the like or combination thereof. Embodiments of the invention further relate to systems and methods for maximizing de-duplication in a distributed de-duplication system. Embodiments of the invention further relate to systems and methods for determining similarity between objects in order to place objects in a de-duplication system and to perform re-balancing in a de-duplication system such as a distributed de-duplication system.

In the following disclosure, a file may refer to data or to a representation of data or to an object. An object or a data object typically refers to a block or a block of data. The block may be a part of a file. For example, a word processing file or other file, during backup, may be broken down into blocks for de-duplication purposes. The blocks typically have the same size such that duplicate blocks can be identified. When an object is hashed, a hash is produced that uniquely represents the object. A fingerprint or encrypted hash represents an encrypted hash.

A set of objects represents a set of objects or a dataset. A hash object represents a set of hashes. Thus, a hash object represents N hashes and also represents N objects, where N is not limited to any particular number. A hash object, as used herein, may also represent encrypted hashes.

A mavector or a similarity vector is a representation of the set of hashes and is thus a representation of a set of objects. A set of similarity vectors may be referred to as a similarity object. The similarity vector, as discussed herein, allows the similarity of a set of objects to be determined with respect to other sets of objects.

The similarity vector, in one example, is used to determine the similarity between one set of objects and another set of objects. During a backup operation, for example, a set of objects can be placed with a node (or a distributed data protection system such as a distributed backup system) that stores a set of objects or sets of objects that are most similar to the set of objects being placed. Similarly, during rebalancing (where the objects stored by the various nodes are redistributed), similar sets of objects can be stored by the same node. This ensures that de-duplication is improved or maximized in a distributed de-duplication system even though each node may maintain its own local de-duplication index (a data structure used to identify duplicate objects or blocks).

In one example, once a destination node for the set of objects being placed is determined using the similarity vector, the objects included in the set of objects being placed or backed up are de-duplicated individually using the destination node's index of hashes.

Embodiments of the invention relate to systems and methods that determine the similarity between a set of objects (e.g., a set of objects being added to or stored in a de-duplication system) and objects (or sets of objects) already stored in a de-duplication system. Determining the similarity of the set of objects can be used to identify where to place the set of objects (e.g., identify a node or of the distributed de-duplication system or a destination of the set of objects). Determining the similarity of a set of objects can also be used to perform re-balancing. For example, sets of objects can be moved to different nodes such that the similarity of objects stored at a particular node is maximized.

In one example, a set of objects is represented by a similarity vector as previously stated. The objects or blocks in the set of objects are typically of the same size or include a distribution of variable sizes. The size of a block is not limited. Further, the size or length of the similarity vector can be selected according to the size of the blocks used in the de-duplication system. One of skill in the art can appreciate, with the benefit of the present disclosure, that the similarity vector or objects are not limited to a particular lengths or sizes.

By way of example and not limitation, a set of hashes may be represented by a 160 byte similarity vector. The size of a set of hashes is determined by the number of unique hashes (e.g., SHA1 hashes) that make up or are included in the set of hashes. For example, a 1 GiB set of hashes with on average 8 KiB hashes and no overlapping hashes will contain 131,072 unique hashes.

The similarity vector represents all of the hashes in the set of hashes in a compact manner. In one example, all of the hashes are effectively represented by a single similarity vector. In order to represent the set of hashes in a compact manner, the properties of a hash algorithm are discussed. One goal of a cryptographic algorithm is to ensure that there are no patterns produced in the result that can be used to identify the underlying data and exploit the algorithm. As a result, hash algorithms and other cryptographic algorithms are designed to produce values that resemble uniform distributions.

Figure 1:
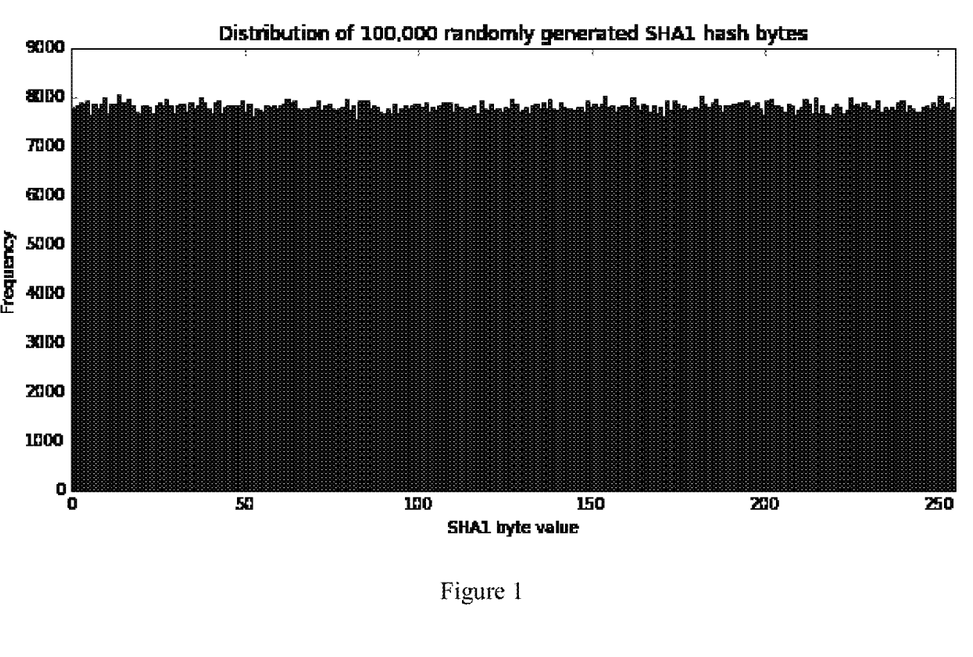
FIG. 1 illustrates an example of a distribution of randomly generated hashes.

FIG. 1, for example, illustrates the distributions of 100,000 SHA1 hashes (represented as 20 byte vectors) generated from random blocks of 8192 byte blocks. FIG. 1 illustrates that the byte values in the 20-byte sequence exhibit uniformity. As a result, patterns in the byte values cannot be exploited to produce compact vectors. Embodiments of the invention, by way of example however, may use statistical properties of these distributions (e.g., mean, variance) to represent a set of hashes.

To ensure that the compact representation has sufficient information points to distinguish one set of hashes from a different set of hashes, the dimensionality of the problem can be increased. More specifically, a SHA1 hash (or other representation) can be considered to be one dimensional if treated as a big number. To increase the dimensionality, the hashes in the set of hashes are represented as 20-byte vectors using a byte decoder. For example, the following hash in hexadecimal representation 48acabfe99721215cb3d471e41bd3890556dd9d5 may be converted to the following 20-byte vector (decimal representation): [72, 172, 171, 254, 153, 114, 18, 21, 203, 61, 71, 30, 65, 189, 56, 144, 85, 109, 217, 213]

In one example, every hash in a set of hashes may be converted to a vector representation in decimal form.

Figure 2:
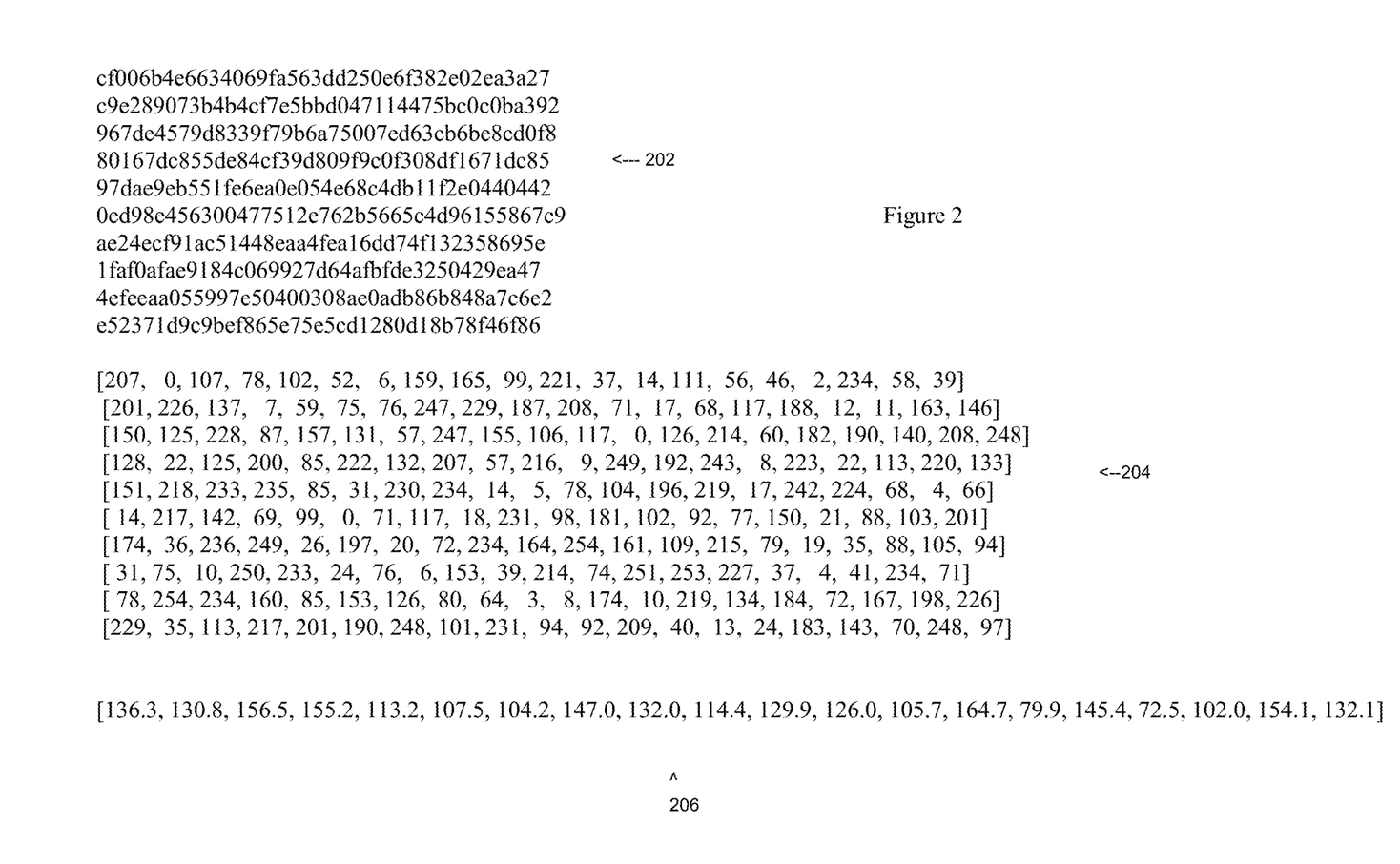
FIG. 2 illustrates an example of generating a similarity vector from a set of hashes.

FIG. 2 represents a conversion of a set of hashes 202 where N=10 or N hashes from hexadecimal form to 20 byte vectors in decimal form (other conversions and representations are possible). As shown in FIG. 2, the resulting matrix 204 represents the 20 byte vectors in rows. The columns of the matrix 204 can also be treated as a set of vectors.

Every unique hash belonging to a set of hashes is converted to this vector representation. This allows each column in the matrix 204 of vectors to be treated as a single dimension which yields 20 dimensions in total. More specifically, each column in the matrix 204 can be viewed as a single dimension with its own distribution and statistical properties. The similarity vector can be produced, in one example, by taking the mean of each column in the matrix.

The first column "207, 201, 150, 128, 151, 14, 174, 31, 78, 229" has a mean of 136.3. By taking the mean of each column, a similarity vector 206 as shown in FIG. 2 can be produced. The similarity vector 206 is:
[136.3, 130.8, 156.5, 155.2, 113.2, 107.5, 104.2, 147.0, 132.0, 114.4, 129.9, 126.0, 105.7, 164.7, 79.9, 145.4, 72.5, 102.0, 154.1, 132.1]

The similarity vector 206 is a compact representation of a set of hashes in the matrix 204 and thus compactly represents the set of hashes and the set of objects. By comparing the similarity vector to other similarity vectors, a similarity between the corresponding sets of objects can be determined. Additional bits or information can be encoded into the similarity vector 206 by taking additional measurements. For example, means of diagonal "columns" in the matrix 204 in one or both directions could also be incorporated into the similarity vector or into a set of similarity vectors that compactly represent the set of vectors.

Using the similarity vectors, sets of same sized sets of hashes can be compared. In one example, the Euclidean distance measurement, which is a fast measurement, in multi-dimensional space is used. In one example, distance between a ground truth similarity vector (i.e., a similarity vector of a set of objects to be placed in a backup system) and a set of 10 million similarity vectors can be compared in ~527 ms using a single thread (this is, of course, dependent on hardware). The measurements can be ordered to rank the similarity of the target similarity vectors with the source similarity vector. In one example, a lower value indicates higher similarity and a higher value indicates lower similarity.

In one example, experiments were conducted to characterize the distributions of Euclidean distanced during similarity vector comparisons. By way of example and not limitation, N is set at 1000 (thus the set of hashes includes 1000 hashes) and a similarity vector is generated for a test set of hashes in the following discussion. The hashes were randomly generated using 8192 byte blocks.

Figure 3:
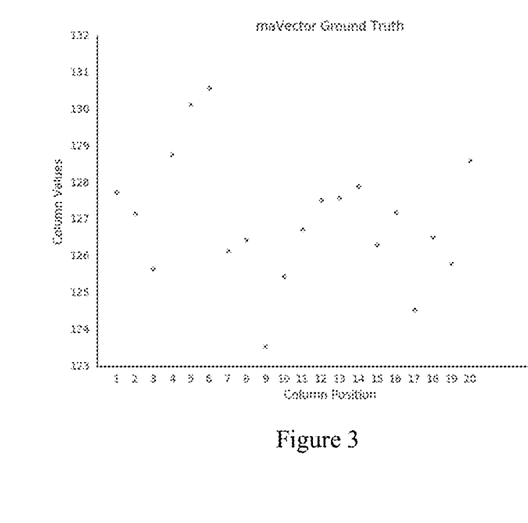
FIG. 3 illustrates a graph of a similarity vector.

FIG. 3 illustrates an example of the test or ground truth similarity vector in graphic form. The graph 300 shows column position versus column value. In FIG. 3, there are 20 column positions and each position has a value between 0 and 255. In this example, the values range between 123 and 132.

Figure 4:
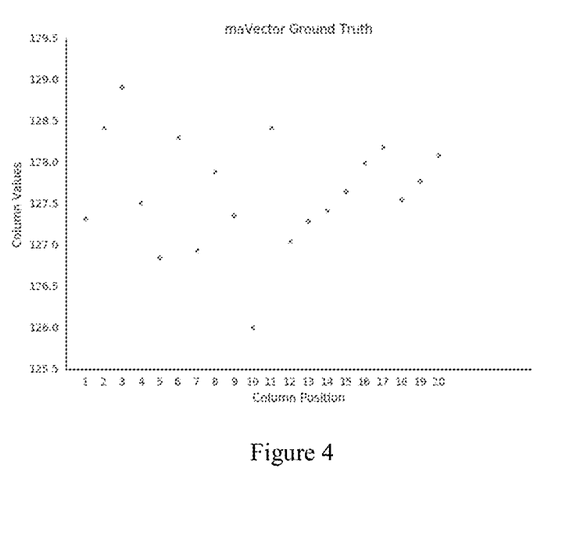
FIG. 4 illustrates a graph of a similarity vector.

FIG. 4 illustrates another example of a test similarity vector where N–10000. In this example, the graph 400 shows column position versus column value. The range of values in the graphs 400 is between 126 and 130. Compared to FIG. 3, FIG. 4 illustrates that as N increases, the range of values decreases. Generally, it is appropriate to compare similarity vectors associated with the same size N.

After generating the test similarity vector, the similarity vector was compared to the similarity vectors of randomly generated comparison similarity vectors. In one example, 20 trials were conducted. In each trial a percentage of the hashes overlapped between the test similarity vector and the comparison similarity vectors. This allows the distribution of Euclidean distances between the test similarity vector and the comparison similarity vectors to be characterized. The overlap intervals were set at intervals between 0 and 95 percent and increasing by 5 percent.

Figure 5:
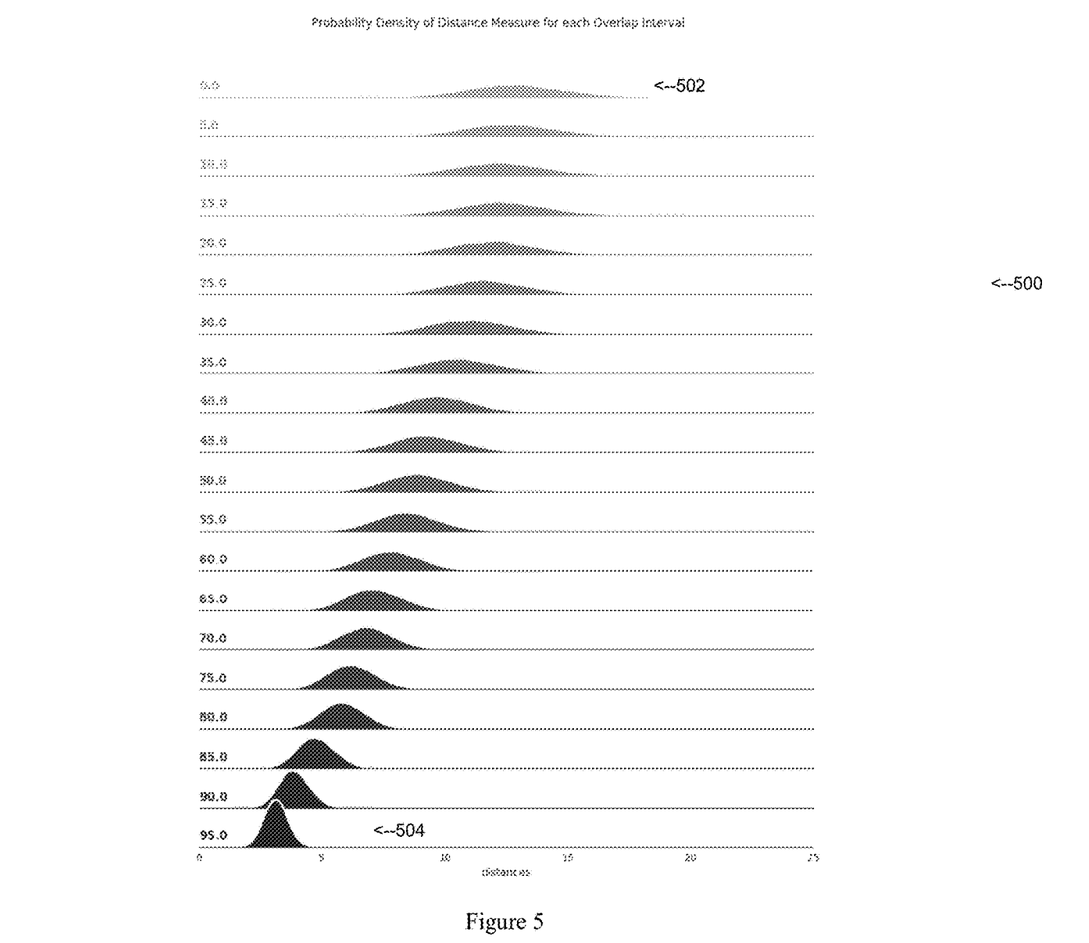
FIG. 5 illustrates a probability density of distance measurements for similarity vectors.

FIG. 5 illustrates a plot 500 illustrating an example of a probability density of distance measure for each overlap interval. The plot 500 resembles a normal distribution. The plot 500 shows that where there is no overlap (0.0 percent) between the test similarity vector and the comparison similarity vectors, a comparatively large range 502 is produced. As the overlap increases, the range of distances decreases and the mean distance decreases from previous distributions. The range 504, for example, is lower and narrower than the range 502. The plot 500 demonstrates that the similarity vector can be used to identify similarly between data objects and/or sets of data objects.

Figure 6:
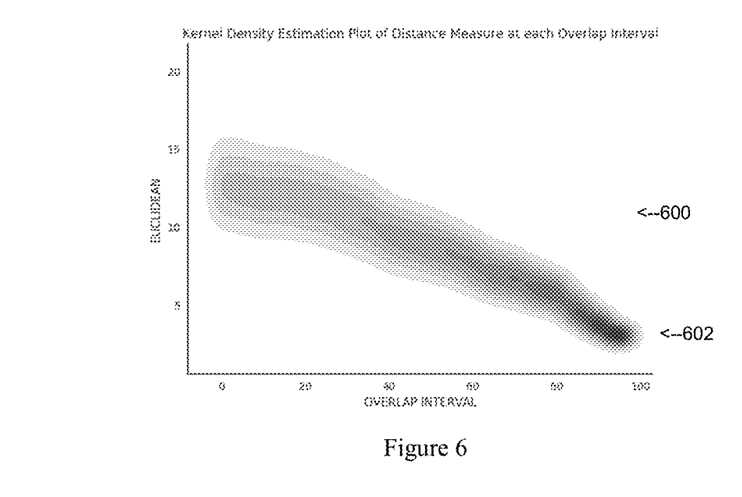
FIG. 6 illustrates a kernel density estimation plot of distance measurements.

FIG. 6 illustrates a kernel density estimation plot 600. The plot 600 shows the same distributions in the plot 500. In the plot 600, the darker shading 602 corresponds with a high overlap on the X axis and a low Euclidean distance on the Y axis. As the overlap interval increases, the Euclidean distance decreases. Given a fixed N (a fixed number of hashes in a set of hashes) and a common hashing algorithm, these Euclidean distances can be normalized and modelled to approximate overlap between same sized sets of objects. Similarly, because each overlap interval resembles a normal distribution, the overlap interval and confidence intervals can be modelled for a given hashing algorithm and N.

Figure 7:
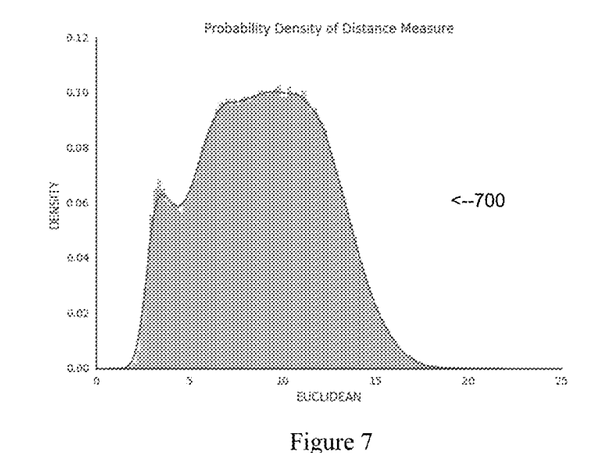
FIG. 7 illustrates a probably density of distance measurements.

FIG. 7 illustrates a probability density of all distance measures across all trials. The plot 700 illustrates that the method becomes more certain as the Euclidean distance decreases, which implies the overlap interval increases.

Figure 8:
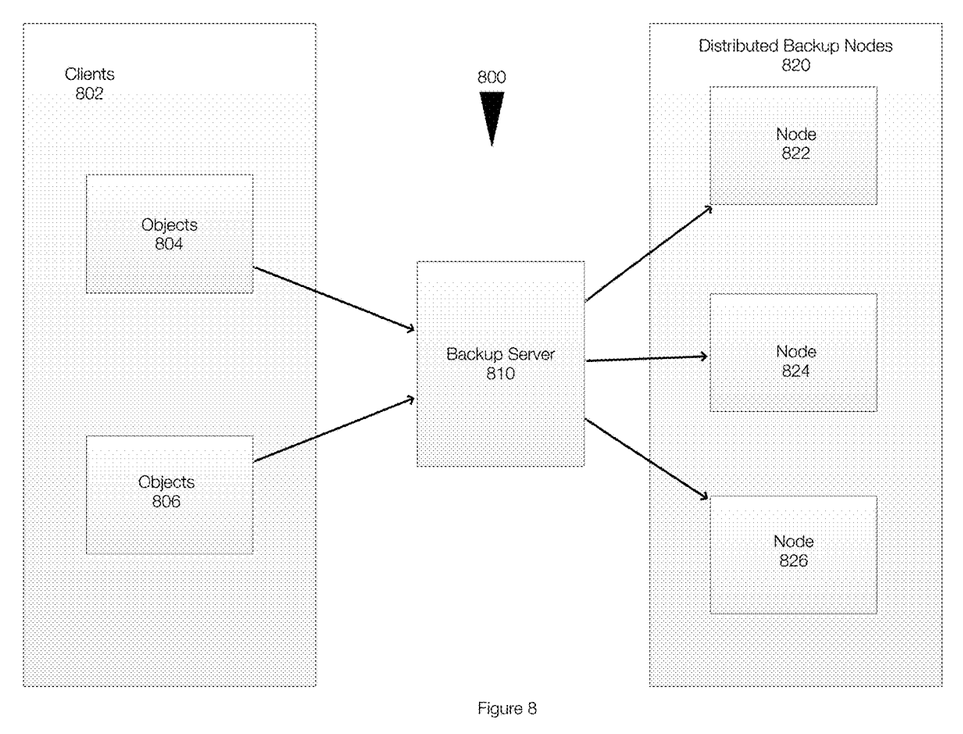
FIG. 8 illustrates an example of a distributed backup system.

FIG. 8 illustrates an example of a distributed data protection system that is configured to perform data protection operations including, but not limited to, backup, restore, de-duplication, mirroring, and other data protection operations or combinations thereof.

FIG. 8 illustrates a distributed backup system 800. The backup system 800 is representative of various backup systems including, but not limited to, Networker, Avamar, Data Domain, distributed backup systems, stand-alone backup systems, server-based backup systems, cloud based backup systems, or the like or combination thereof. In FIG. 8, a backup server 810 is configured to interact with clients 802 and distributed backup nodes 820. Each of the nodes 820 could also represent a backup or data protection system. The nodes 820 may also cooperate to form a distributed data protection system.

The clients 802, the server 810, and the distributed backup nodes 820 may each include hardware such as processors, and other hardware to communicate over a network, or the like. The distributed backup nodes 820 may also include or be associated with memory for storing backups such as save sets, snapshots, and other backups, and the like.

More specifically, the system 820 includes nodes, represented by nodes 822, 824, and 826. These nodes are similarly configured such that a description of one may apply to a description of the others.

Each node is configured to store or backup a portion of the objects 804 and objects 806, which are associated with the clients 802. The node 822, for example, may backup various datasets for one or more of the clients 802. The datasets stored by the node 822 are de-duplicated. In one example, the node 822 de-duplicates objects independently of the de-duplication performed by the nodes 824 and 826. Thus, the de-de-duplication is distributed and local. De-duplication may occur at the client, the server 810 or the nodes 820. In one example, because the nodes 820 may each maintain or have access to a portion of a distributed index, the de-duplication occurs local to the nodes 820.

For example, the node 822 maintains an index that stores hashes (or fingerprints) that allows objects sent to the node 822 to be de-duplicated. However, the index maintained by the node 822 may differ from the indexes maintained by the nodes 824 and 826. The indexes may differ totally or partially. As a whole, the indexes of all of the nodes may represent all of the objects stored in the distributed backup nodes 820. In effect, the distributed backup system 800 is associated with a distributed index. In addition, the indexes may change over as objects are added to and removed from the nodes 820.

During a backup operation, a dataset or set of objects may be prepared. The backup server 810 (or other portion of the backup system) places the set of objects with one of the nodes 820. Using the similarity vector generated from a set of hashes corresponding to the set of objects, the set of objects can be placed with the node that already stores objects that are most similar to the set of objects being placed.

Figure 9:
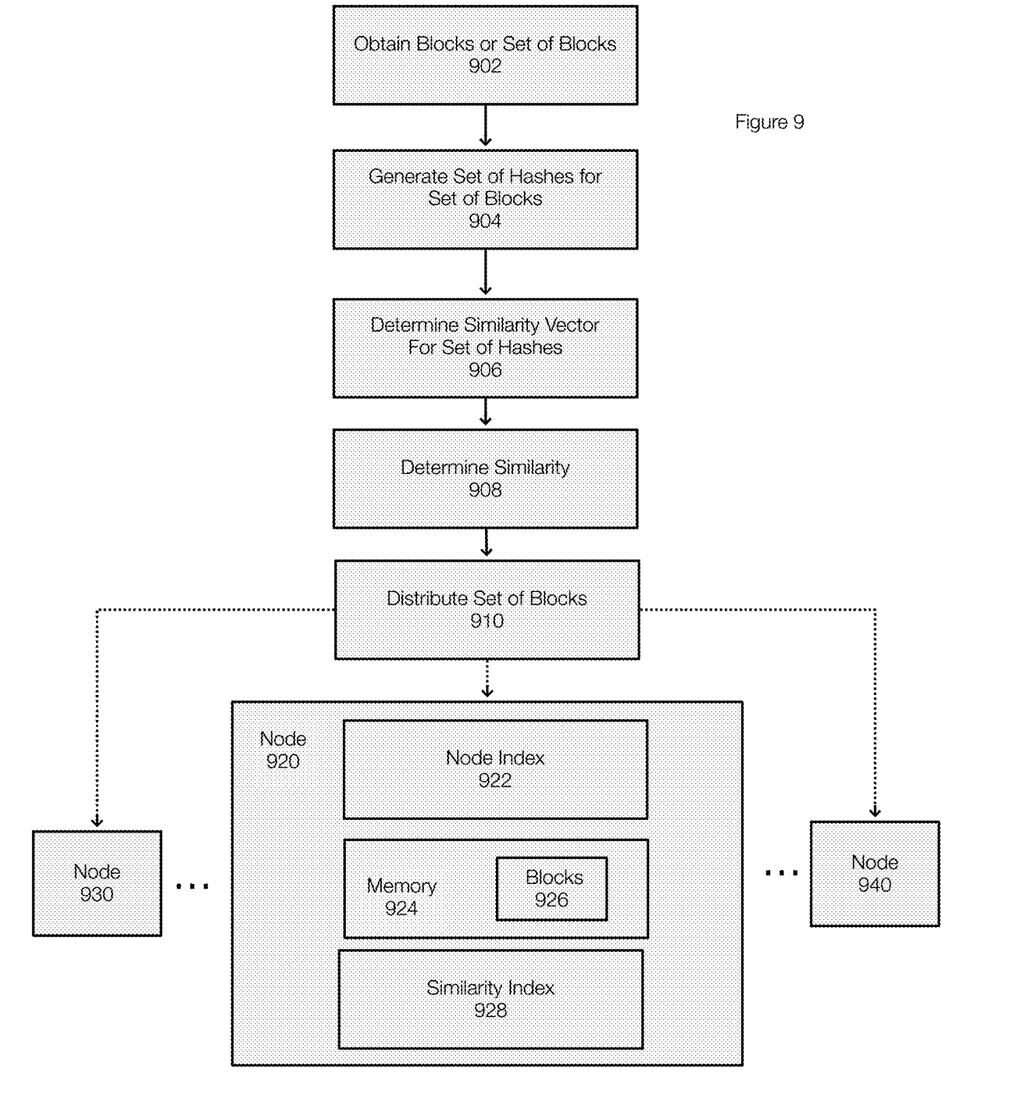
FIG. 9 illustrates a method for placing objects in a distributed backup system.

FIG. 9 illustrates a method for performing a backup operation. The backup operation may be initiated by a client, by the backup server, periodically, as needed, or the like. In addition, the steps and acts described herein may be performed by the clients, the backup server, the nodes, or in coordination. For example, each of the clients may include an agent (executable instructions) that cooperates with the backup server to perform the backup operation.

FIG. 9 illustrates systems and methods for placing data in a data protection system. FIG. 9 is described in the context of a single client and a single set of blocks to simply the description. However, the method shown in FIG. 9 can be adapted to backup multiple sets of blocks from the same client at the same time, from multiple clients at the same time, or the like. Thus, the backup operation can be performed for a single client at a time, for multiple clients at the same time, or the like. An agent, in addition, may also backup multiple clients. A client may be a volume, a virtual machine, a disk drive, a virtual disk drive, a shared volume, or the like or combination thereof. The client may also be cloud based.

FIG. 9 begins when a set of blocks is identified or obtained in block 902. For example, a container of blocks may be identified for backup. The set of blocks is identified from blocks or generated from blocks that need to be backed up. In an incremental backup, these blocks may be the blocks that have changed at the client since the most recent backup. The backup may be a full backup or the like. In another example, a container may be used to store N blocks. When the container is full, the container constitutes a set of blocks and is ready for backup. Thus, the type of backup can vary.

In block 904, hashes are generated for each of the blocks in the set of blocks and organized into a set of hashes. Thus, the set of hashes corresponds to the set of blocks. In one example, the set of blocks includes N blocks and the set of hashes includes N hashes.

After the set of hashes are prepared, a similarity vector is prepared or generated for the hashes in block 906. The similarity vector is a compact representation of a set of hashes and also represents the set of blocks.

The processing power necessary to achieve a similarity vector with sufficient distribution or information can depend on how the similarity vector is generated. Further, the manner in which the entries in the similarity vector are represented may also depend on how the similarity vector is organized. The example previously described generated a 20 byte vector. In this case, each entry in the similarity vector (e.g., the mean of each column in the matrix) may be represented as a 64-bit floating point number. This type of precision allows the similarity vector to have a sufficient distribution and statistical properties so that the similarity vector can be compared to others.

In another example, the matrix of hashes may be divided into columns on a bitwise basis. Thus, each byte column may be expanded into 8 single bit (1 or 0) columns. This allows the entries in the similarity vector to be represented by 8×20 columns which increases dimensionality from 20 to 160, by way of example only. Thus, the similarity vectors can be generated using more information points.

In block 908, the similarity of the set of objects being placed to existing (e.g., already backed up) sets of objects is determined using the similarity vector generated from the set of hashes associated with the set of objects. This is achieved, in one example, by providing the nodes (e.g., nodes 920, 930, 940) with the similarity vector of the set of blocks to be backed up or placed. The similarity vector of the blocks to be placed may be referred to as a ground truth similarity vector.

More specifically, the node 920, like the nodes 930 and 940, stores a node index 922, which is part of a distributed index in one example. The node index 922 stores hashes that allow the objects to be de-duplicated. The node 920 also maintains a similarity index 928. The similarity index 920 stores similarity vectors for each set of objects stored in a memory 924, which stores the objects 926. When the set of objects are placed, the node receiving the set of objects may perform de-duplication on the set of objects.

The node 920 thus compares the ground truth similarity vector with the similarity vectors stored in the similarity index 928. Based on these comparisons, the node 920 generates a similarity value (e.g., a multi-dimensional Euclidean distance) for each comparison of the set of objects (or for a portion thereof). For example, if the node 920 stores two sets of objects, then two similarity values are generated by comparing the ground truth similarity vector with the similarity vector of the first set of objects and by comparing the ground truth similarity vector with the similarity vector of the second set of objects. The comparison may result in a distance. These values are returned to the backup server or to the client.

Similarly, the other nodes 930 and 940 return values. The backup server (or the client) then determines which node contains the objects most similar to the set of objects being backed up based on the values. In other words, the backup server or the client determines which node stores objects that are most similar to the set of objects being backed up or placed. The similarity vector thus reflects which node is likely to achieve the highest amount of de-duplication with respect to the destination node and with respect to global de-duplication in the distributed data protection system.

Determining which node is to receive the set of objects to be backed up can be based on a single similarity vector or on multiple similarity vectors. For example, if a node returns a similarity vector with a similarity value indicating a high similarity and a similarity value indicating low similarity, the node may still receive the set of objects to be backed up based on the similarity value indicating a high similarity value.

However, another node may return similarity values that are in between the values reported by a different node. Determining which node receives the set of objects to be backed up can be determined based on thresholds in this example.

After determining the similarity in block 908, a node is selected and the set of objects is distributed to or placed with the selected node in block 910. Once the set of objects is received by the selected node, the selected node may de-duplicate the objects using the node index. The node index may also be updated for objects that are not already stored at the selected node.

Figure 10:
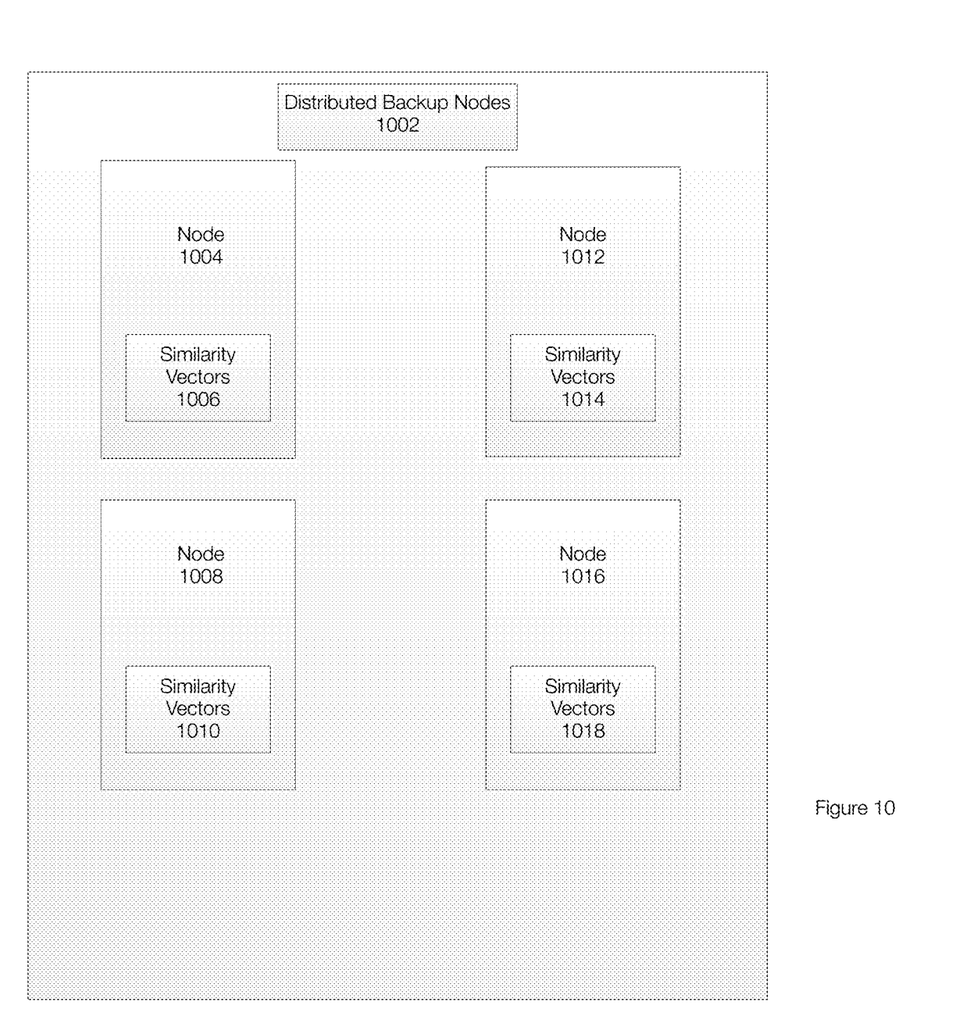
FIG. 10 illustrates systems and methods for re-balancing objects in a distributed backup system.

In one example, information regarding the sets of objects is maintained by the nodes or by the backup server. This allows the sets of objects to be re-balanced over time. FIG. 10 illustrates an example re-balancing nodes in a backup system. The distributed backup nodes 1002 includes nodes 1104, 1008, 1012 and 1016. The similarity vectors 1006, 1010, 1014, and 1018 (these may each contain multiple similarity vectors) are all compared and the sets of objects are re-distributed to the nodes accordingly. For example, one or more of the similarity vectors are include in the similarity vectors 1006 may be identified as home similarity vectors. These home similarity vectors may be similar. Home similarity vectors for the other nodes preferable have similarity values that are as far away as possible. When rebalancing the objects stored in the distributed system, the sets of objects from the nodes 1008, 1012 and 1016 whose corresponding similarity values are close to the home similarity values of the node 1004 are moved to the node 1004. Similarly, the sets of objects in the backup nodes 1002 are moved or re-balanced in a similar manner. This ensures that the data objects at the nodes 1002 are similar and improves the likelihood that a new set of objects will be delivered to the node that already stores similar objects.

When performing the backup operation and there are not enough hashes to fill a set of hashes, the missing hashes or tail end of the matrix may be ignored. Alternatively, these objects may be saved till a later backup or temporarily backed up until sufficient objects and hashes are available.

As previously stated, when determining placement, the similarity vectors of the other nodes or of the other de-duplication systems can be shared with the system (e.g., client or the backup server) making the placement decision. The benefit of this approach is the system making the decision can rule out a destination node or a destination de-duplication system early if a desired similarity goal is achieved before completing the comparison. Alternatively, the similarity vector of the set of objects to be backed up can be transmitted to the other deduplication systems or nodes where the comparison is performed local to each deduplication system. Each deduplication system or node returns the lowest (or top N) distance measures for similarity vector so that de-duplication system (e.g., client or the backup server) making the placement decision can select the appropriate de-duplication system using a set of rules.

The rules may be as simple as identifying the best similarity value. Additional rules may include available free space, tie-breaking (based on available size, or next best similarity value, best average similarity value, type of storage, access times, etc.).

If a set of objects or a set of hashes is updated with new hashes, the corresponding similarity vector can also be updated by adding or subtracting the vectors that were updated or altered during the update. This approach of maintaining the currency of the similarity vector is both quick and efficient. Similarly, when each de-duplication system (e.g., de-duplication node) performs garbage collection, (i.e. removal of blocks and corresponding hashes no longer referenced by deleted files) the similarity vectors impacted by the removal of hashes can be updated.

If the objects or hashes associated with a similarity vector have changed substantially (i.e. some percentage of hashes have been altered), the altered similarity vector can be compared with the local deduplication system and other deduplication systems (as described previously) to determine if it would be advantageous to relocate the objects or the dataset.

As previously described, the similarity vectors can also be used to optimize replication amongst pairs of deduplication systems. Traditionally, replication relationships between deduplication systems are fixed and static regardless of deduplication efficiency. In an environment where there are a set of remotely located deduplication systems all replicating to one of a group of centralized deduplication systems, similarity vectors can be used to determine which centralized deduplication system should receive a replica copy of a file on a remotely located deduplication system such that deduplication efficiency is maximized. The approach is analogous to object placement previously described. In the replication case, when similarity vectors are used, related files from unrelated remote deduplication systems will have a greater chance of converging onto the same centralized deduplication system. This ensures the centralized replica storage space is maximized and the network bandwidth between remote and centralized sites is minimized.

Similarity vectors can be used between proprietary client-side deduplication protocols such as Data Domain Boost and deduplication systems such as Data Domain. Today, every time a client sends a block to a deduplication system it first generates a hash and asks the deduplication system whether the hash is already present, by sending an ISPRESENT request. If the hash is not present the client sends the deduplication system the block payload. If the hash is present the client does not send the block payload. If a client needs to send the deduplication system a file that contains either no or a small number of SHA1 hashes already present on the deduplication system, then this ISPRESENT protocol generates redundant chatter, bandwidth and processing that delivers no client or server side benefits. This unnecessary activity can be avoided by requiring the client to produce similarity vectors of fixed-size sets of hashes and sending these to the deduplication system before sending ISPRE-SENT requests. Instead of sending an ISPRESENT request for hashes the client will first accumulate a set of hashes, generate a similarity vector and send the deduplication system the similarity vector in a request to perform a similarity measure with other similarity vectors. The deduplication system returns the client a similar measure, such as a similarity value. If the measurement falls within a pre-defined threshold that implies there are no similarity vectors on the deduplication system similar to the ground truth similarity vector, the client can decide to simply send the file (e.g., set of objects) verbatim to the deduplication system thus avoiding the unnecessary ISPRESENT requests. This simple round trip of one similarity vector comparison per N SHA1 hashes can avoid a significant (worst case N−1) number of round trips. The application of similarity vectors enables more efficient transmission of unique data the deduplication system has not seen previously.

Similarity vectors can also be used as an efficient algorithm for classifying data. Using a training corpus of pre-classified files, a set of hashes can be generated for each class of files. The hashes for each class of files can be combined into fixed-size groups of hashes represented by a set of similarity vectors. As new data is generated, the new data undergoes the same process. Hashes are generated and grouped to produce a set of similarity vectors. The similarity vectors for the new files are compared against the similarity vectors of the pre-trained corpus and the file is classified using a softmax function. This produces a probability match for each class available in the pre-trained corpus.

A similarity vector can be used as a heuristic for delta compression technologies. Delta compression seeks to store the unique delta between two or more objects. In order to minimize the size of the delta, similar objects should be compared. The similarity vector can act as the heuristic necessary to determine which files amongst a set of files should be compared for delta compression. This technique can be applied to storage systems that seek to reduce data storage consumption through efficient compression techniques.

The similarity vector can be applied to WAN networking devices that seek to reduce the amount of data transmitted over a network. Similarity vectors can be used to represent each fixed-size network payload. These payloads are cached at the source and target for a predefined period of time. When a new payload is generated, the corresponding similarity vector is computed and measured against previous payloads similarity vectors. If a distance threshold is found the current payload is delta compressed with the previous payload that yield the lowest distance measure, and the differences are characterized as read/write offset, length operations and any residual payloads. These operations are sent to the target network device to reproduce the payload using previously cached payloads and avoiding transmission of previously seen data.

A similarity vector can be used to detect information leakage in an efficient manner. A file or set of files that represents sensitive information can be represented as similarity vectors and compared for similarity with other files also represented as similarity vectors. The similarity values can be used as an initial method to filter down the list of possibly similar files, before proceeding with computationally expensive binary comparisons.

A similarity vector can be used as the similarity measure for modelling storage workloads in order to approximate the potential space saving from de-duplicating the workload. A similarity vector can be used as a method to approximate the potential space gained by consolidating similar deduplication storage systems.

The similarity vector can be used as a compact representation of objects for means of comparing similarity between same-sized objects or same sized sets of objects. When N=1000 and or N=10000 objects, by way of example respectively, this is equivalent to 156.25 MiB and 1.52 GiB sized data objects. These sets of objects can be represented using an efficient 160-byte similarity vector and compared amongst a set of same-sized objects. By ranking the Euclidean distance from lowest to highest between the ground truth similarity vector and the comparison set of similarity vectors, sets of objects that contain data that is most similar to the set of objects associated with the ground truth similarity vector can be identified.

Example Computing Devices and Associated Media

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for placing a set of objects in a distributed data protection system, the method comprising:

generating a hash for each object in a set of objects and representing each hash as a vector having n entries, wherein the set of hashes constitute a matrix of vectors and wherein each of the vectors is a row in the matrix, wherein each of the n entries of each hash is included in a different column of the matrix of vectors, wherein the matrix of vectors has n columns, wherein each entry in each column includes a value from one of the hashes and wherein each entry for each vector corresponds to a portion of the corresponding hash;

generating a similarity vector for the set of objects, wherein the similarity vector has n entries, wherein each entry in the similarity vector is generated from one of the n columns such that each entry in the similarity vector represents corresponding entries from all of the vectors in the matrix of vectors, wherein the distributed data protection system includes a plurality of nodes, wherein the similarity vector represents each of the objects in the set of objects, wherein each entry in the similarity vector includes a mean of values in a corresponding column in the n columns of the similarity vector;

comparing the similarity vector with destination similarity vectors associated with sets of objects already placed in the distributed data protection system, wherein the comparisons result in similarity values that determine how similar the set of objects is to each of the sets of objects;

selecting a node from the plurality of nodes based on the similarity values; and placing the set of objects with the selected node.

2. The method of claim 1, wherein the columns are vertical and/or diagonal.

3. The method of claim 1, wherein each entry in each column includes at least one bit.

4. The method of claim 1, wherein comparing the similarity vector with the destination similarity vectors includes determining a Euclidean distance as a similarity value.

5. The method of claim 1, wherein each node includes a portion of an index used for de-duplicating the objects at each node.

6. The method of claim 5, further comprising backing up the set of objects at the selected node.

7. The method of claim 6, further comprising de-duplicating the set of objects at the selected node.

8. A method for placing a set of objects in a distributed data protection system, the method comprising:

identifying a set of objects for placement in a data protection system;

generating a set of hashes corresponding to the set of objects, wherein the set of hashes includes a hash for each of the objects in the set of objects;

generating a vector matrix that includes vectors, wherein each of the vectors is generated from one of the hashes such that each vector corresponds to an object in the set of objects, wherein each of the vectors include n entries, wherein each of the n entries of each hash is included in a different column of the vector matrix, wherein the vector matrix includes n columns, wherein each entry in each column includes a value from one of the hashes and wherein each entry for each vector corresponds to a portion of the corresponding hash;

generating a similarity vector for the set of objects, wherein the similarity vector has n entries, wherein each entry in the similarity vector is generated from one of the n columns such that each entry in the similarity vector represents corresponding entries from all of the vectors in the matrix of vectors, wherein the similarity vector is a compact representation of all objects in the set of objects, wherein each entry in the similarity vector includes a mean of values in a corresponding column in the n columns of the similarity vector;

comparing the similarity vector with destination similarity vectors associated with sets of objects already placed in the distributed data protection system, wherein the comparisons result in similarity values that determine how similar the set of objects is to each of the sets of objects;

selecting a node from the plurality of nodes based on the similarity values; and placing the set of objects with the selected node.

9. The method of claim 8, wherein the set of objects includes N objects and the set of hashes includes N hashes.

10. The method of claim 8, wherein the columns are vertical and/or diagonal.

11. The method of claim 8, wherein each entry in each column includes at least one bit.

12. The method of claim 8, further comprising rebalancing the objects stored at the plurality of nodes.

13. The method of claim 8, further comprising comparing the similarity vector with a subset of destination similarity vectors of each node.

14. The method of claim 8, wherein each node maintains destination similarity vectors for different sets of objects.

15. The method of claim 8, further comprising de-duplicating the set of objects at the selected node.

16. A non-transitory computer readable medium comprising computer executable instructions for performing operations of a method for placing a set of objects in a distributed data protection system, the method comprising:

generating a hash for each object in a set of objects and representing each hash as a vector having n entries, wherein the set of hashes constitute a matrix of vectors and wherein each of the vectors is a row in the matrix, wherein each of the n entries of each hash is included in a different column of the matrix of vectors, wherein the matrix of vectors has n columns, wherein each entry in each column includes a value from one of the hashes and wherein each entry for each vector corresponds to a portion of the corresponding hash;

generating a similarity vector for the set of objects, wherein the similarity vector has n entries, wherein each entry in the similarity vector is generated from one of the n columns such that each entry in the similarity vector represents corresponding entries from all of the vectors in the matrix of vectors, wherein the distributed data protection system includes a plurality of nodes, wherein the similarity vector represents each of the objects in the set of objects, wherein each entry in the similarity vector includes a mean of values in a corresponding column in the n columns of the similarity vector;

comparing the similarity vector with destination similarity vectors associated with sets of objects already placed in the distributed data protection system, wherein the comparisons result in similarity values that determine how similar the set of objects is to each of the sets of objects;

selecting a node from the plurality of nodes based on the similarity values; and placing the set of objects with the selected node.

* * * * *